United States Patent [19]

Kondziola

[11] 4,429,920

[45] Feb. 7, 1984

[54] LOAD TRANSFER SYSTEM FOR SEAT MOUNTED RETRACTOR

[75] Inventor: Joseph D. Kondziola, Troy, Mich.

[73] Assignee: General Motors Corporation, Detroit, Mich.

[21] Appl. No.: 299,407

[22] Filed: Sep. 4, 1981

[51] Int. Cl.³ .............................................. B60R 21/00
[52] U.S. Cl. ............................. 297/478; 242/107.4 A; 280/807; 297/480
[58] Field of Search ................... 297/478, 216, 480; 280/804, 801, 806, 807; 242/107.2, 107.4 A

[56] References Cited

U.S. PATENT DOCUMENTS

| | | | |
|---|---|---|---|
| 3,323,829 | 6/1967 | Liem | 297/478 X |
| 4,109,962 | 8/1978 | Magvar | 297/474 |
| 4,135,683 | 1/1979 | Stephenson et al. | 297/478 X |
| 4,164,337 | 8/1979 | Blom | 297/478 |
| 4,264,091 | 4/1981 | Lee | 280/804 |
| 4,344,589 | 8/1982 | Rumpf | 242/107.4 A |
| 4,349,164 | 9/1982 | Naitoh | 297/478 |

FOREIGN PATENT DOCUMENTS 2405635 10/1974 Fed. Rep. of Germany ...... 297/216

Primary Examiner—James T. McCall
Attorney, Agent, or Firm—Charles E. Leahy

[57] ABSTRACT

A restraint belt retractor includes a belt reel rotatably mounted on a retractor housing which is adapted for mounting on the vehicle seat. A winding spring rotates the reel in a belt winding direction. The imposition of an occupant restraint load on the belt subsequent to reel lockup by an inertia actuated reel locking means actuates a belt clamping mechanism which clamps the belt to limit its extension from the reel. The retractor housing also mounts a rotatable anchor belt reel for winding and unwinding an anchor belt having an end mounted on the vehicle body rearward of the seat. A lock bar for locking the anchor belt reel is actuated to the locking condition in response to the actuation of the belt clamping mechanism to thereby fix the length of the transfer belt and anchor the retractor housing and seat against forward movement by the occupant restraint load. An inertia actuated weight may be associated with the lock bar to actuate lock bar independently of the actuation of the restraint belt clamping mechanism.

3 Claims, 4 Drawing Figures

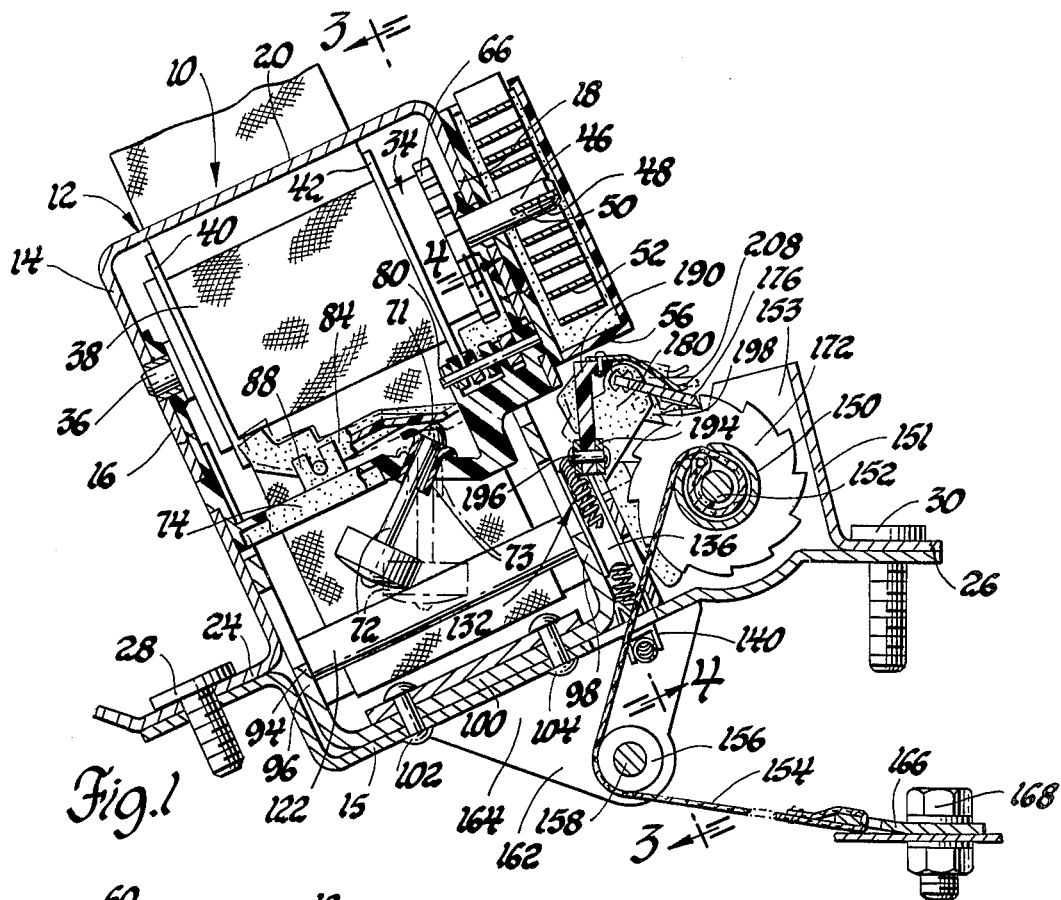
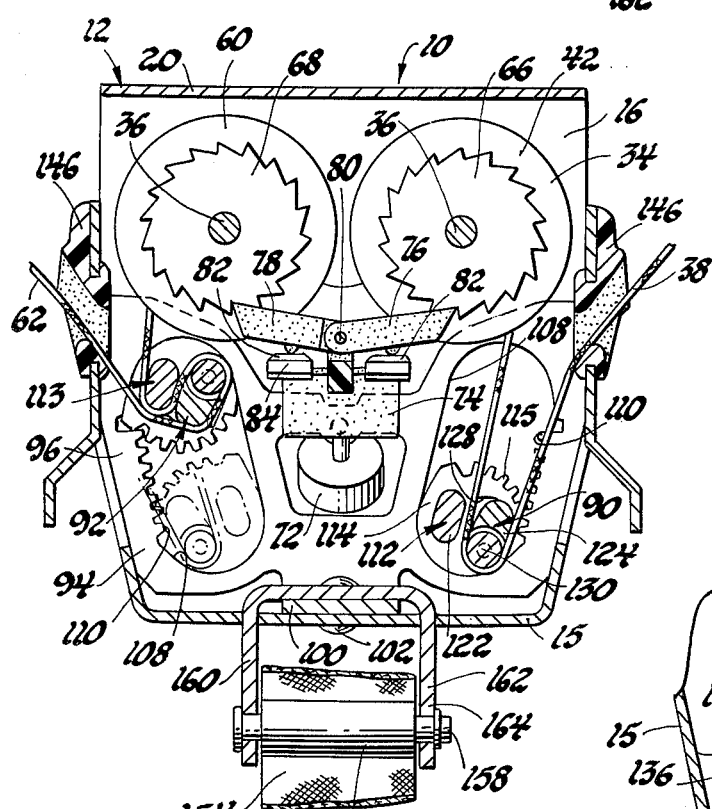
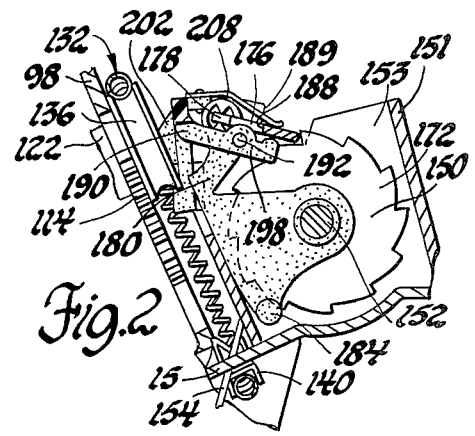
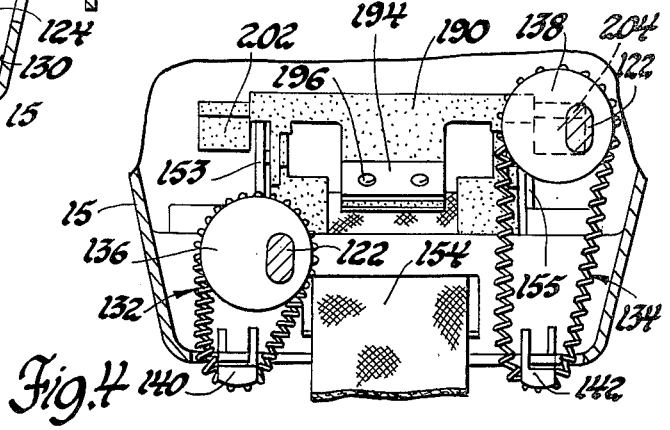
Fig. 1
Fig. 2
Fig. 3
Fig. 4

LOAD TRANSFER SYSTEM FOR SEAT MOUNTED RETRACTOR

This invention relates to a seat belt retractor mounted on the seat and more particularly provides an auxiliary reel for winding a load transfer anchor belt connected with the vehicle floor and a mechanism for locking the auxiliary reel in response to the actuation of a restraint belt clamping means associated with the retractor so that the retractor and seat are anchored against forward movement by the occupant restraint load imposed thereon.

BACKGROUND OF THE INVENTION

It is well known to provide a passive seat belt wherein one belt end is mounted inboard the seat by a retractor and the other belt end is mounted on the door. Opening and closing movement of the door automatically winds and unwinds the belt between restraining and nonrestraining positions relative the seated occupant. It is characteristic of such a passive belt system that many layers of belt are wound upon the reel when the door is closed and the belt is in the restraining position. The prior art has provided various belt clamping mechanisms movably mounted on the retractor adjacent the exit of the belt from the reel and effective to clamp the belt against spooling down and extending from the reel after the reel is locked by an inertia sensor. For example, U.S. Pat. No. 4,120,466, issued Oct. 17, 1978 to Adomeit, disloses a self-actuated belt clamping device in which the belt is guided around the end of a lever so that imposition of an occupant restraint load on the belt pivots the lever to clamp the belt between a locking surface carried on the lever and a locking surface mounted on a fixed housing. U.S. Pat. No. 4,300,731 issued Nov. 17, 1981 to Joseph D. Kondziola provides a spindle mechanism which traverses a toothed rack upon onset of an occupant restraint load to roll-up and clamp the belt thereby preventing spool-out of the belt wound upon the reel.

It has been recognized in the prior art that the mounting of a restraint belt on the vehicle seat may require a system of anchoring the seat to the vehicle floor to prevent forward movement of the seat by the occupant restraint loads transmitted from the retractor to the seat. U.S. Pat. No. 4,109,962 issued Aug. 29, 1978 to Joseph J. Magyar discloses a reel mounted on the seat for winding and unwinding an anchor belt attached to the vehicle body floor rearward the seat. A reel locking pawl is actuated by the onset of an occupant restraint load to thereby lock the belt reel and fix the length of the anchor belt to restrain the seat and the belt attached thereto from forward movement. U.S. Pat. No. 4,264,091, issued Apr. 28, 1981 to David N. Lee, discloses the use of an inertia locking mechanism for locking an anchor belt reel to fix the seat against forward movement by the occupant restraint load.

SUMMARY OF THE INVENTION

A restraint belt retractor includes a belt reel rotatably mounted on a housing which is adapted for mounting on the vehicle seat. A winding spring rotates the reel in a belt winding direction. An inertia actuated reel locking means acts between the housing and the reel to selectively lock the reel against belt unwinding rotation so that a load imposed on the belt during restraint of an occupant tends to tighten or spool-down the wound-up belt on the reel. A belt roll-up and clamping mechanism includes a spindle having pinion gears which mesh with toothed racks on the housing. The imposition of an occupant restraint load on the belt subsequent to reel lockup by the inertia actuated reel locking means causes the spindle to move linearly and rotationally along the rack so that the belt is rolled up and clamped to limit its spool-down extension from the reel by the occupant restraint load imposed thereon. The retractor housing also mounts a rotatable anchor belt reel for winding and unwinding an anchor belt having an end mounted on the vehicle body rearward of the seat. A lock bar is selectively engageable with the anchor belt reel to lock the anchor belt reel. An operation member is pivotally moved by the belt clamping movement of the belt roll-up and clamping mechanism and engages the lock bar with the anchor belt reel so that the length of the anchor belt if fixed and anchors the seat against forward movement by the occupant restraint load. An inertia actuated weight may be associated with the lock bar to actuate the lock bar independently of the actuation of the restraint belt clamping mechanism.

The object, feature and advantage of the invention resides in the provision of an anchor belt retractor which is locked against anchor belt unwinding rotation in response to the actuation of a restraint belt clamping means.

Another object, feature and advantage of the invention resides in the provision of a seat mounted passive restraint belt retractor having a belt clamping means which is actuated in response to onset of an occupant restraint load and automatically actuates a lock bar for locking an anchor belt reel to fix the length of an anchor belt attached to the vehicle body rearward the retractor and seat so that the retractor and seat are anchored against forward movement relative the vehicle body by the occupant restraint loads imposed thereon.

DESCRIPTION OF THE DRAWINGS

These and other objects, features and advantages of the invention will become apparent upon consideration of the specification and the drawings in which:

FIG. 1 is an elevation view of a seat belt retractor having the seat belt reel locked against unwinding rotation by an inertia actuated pawl, a belt roll-up and clamping mechanism actuated to clamp the belt against spool-down on the reel, and an anchor belt reel locked by a lock bar actuated by the belt clamping mechanism;

FIG. 2 is an enlarged fragmentary view similar to FIG. 1 and showing the lock bar of the transfer belt reel moved to the engaging position by the belt clamping movement of the belt roll-up and clamping mechanism;

FIG. 3 is a sectional view taken in the direction of arrows 3—3 of FIG. 1 and in which the belt roll-up and clamping mechanism of the left-hand driver—s belt reel is shown actuated to the belt clamping position and the belt roll-up and clamping mechanism of the right-hand passenger belt reel is shown in the belt unclamping position; and FIG. 4 is a sectional view taken in the direction of arrows 4—4 of FIG. 1.

DESCRIPTION OF THE PREFERRED EMBODIMENT

Referring to FIG. 1, there is shown a seat belt retractor 10 according to the invention. The retractor 10 includes a stamped steel housing 12 comprised of an upper housing portion 14 and a lower housing portion 15. The upper housing portion 14 includes laterally spaced walls 16 and 18 joined together by an integral top wall 20. The upper housing portion 14 also includes offset mounting legs 24 and 26 which receive a pair of bolts 28 and 30 which also extend through the lower housing portion 15 to attach the retractor housing 12 to a vehicle seat, not shown.

The Reels

A restraint belt reel 34 includes a reel shaft 36 having its ends extending through aligned apertures of the housing walls 16 and 18. A restraint belt 38 is attached to the reel shaft 36 and wound between a pair of end flanges 40 and 42. The end 46 of the reel shaft 36 extends outwardly through the housing wall 18 and has a slot 48 receiving the inner end 50 of a spiral windup spring 52. The outer end of the spiral spring is suitably anchored on a plastic spring housing 56 attached to the housing wall 18 so that the spring 52 biases the reel 34 in the belt winding direction of rotation.

Referring to FIG. 3, it is seen the retractor 10 includes a second restraint belt reel 60 which is constructed identically to the reel 34 and has like element identified by like reference numerals. The reel 60 winds and unwinds a restraint belt 62. The belts 38 and 62 are respectively attached to the passenger door and the driver door so that the opening movement of the doors automatically unwinds the belts from the retractor and the swing geometry of the doors moves the belts outwardly and forwardly of the seated occupant to facilitate occupant ingress and egress.

The Reel Locking Mechanism

As best seen in FIGS. 1 and 2, ratchet plates 66 and 68 are mounted respectively on the reels 34 and 60. An inertia sensing pendulum 72 is suspended by its head 71 within a gimbal sleeve 73 suspended from a molded plastic pendulum support 74 mounted on the housing walls 16 and 18. A pair of lock pawls 76 and 78 are mounted on the pendulum support 74 by a pivot shaft 80. A molded plastic transfer link 84 has laterally extending pivot pins, one of which is indicated at 86, which seat within upwardly opening mounting cradles on the support 74, one of which is shown at 88. The other end of the transfer link, as seen in FIG. 3, includes a first abutment portion 82 which underlies and supports the pawl 76 and a second abutment portion 82 which underlies and supports the second pawl 78. The pendulum head 71 underlies and supports a central portion of the transfer link 84.

A rapid deceleration of the motor vehicle causes the pendulum 72 to tilt from the phantom line indicated normal position of FIG. 1 to the solid line indicated tilted position in which the pendulum head 71 pivots the transfer link 84 upwardly to raise the pawls 76 and 78 into engagement with the ratchet plates 66 and 68 of the reels 34 and 60. Reference may be had to allowed copending patent application Ser. No. 299,406 filed Sept. 4, 1981 by Kondziola et al for a more detailed description of the manner in which the pendulum 72 operates through the transfer link 84 to actuate the pawls 76 and 78 sequentially or simultaneously into engagement with their respective ratchet plates.

The Belt Clamping Mechanism

Referring again to FIG. 3, it is seen that belt roll-up and clamping mechanisms generally indicated at 90 and 92 are associated respectively with the belt reels 34 and 60. Referring to the belt clamp and roll-up mechanism 90, it will be understood that a frame 94 includes a pair of upstanding legs 96 and 98 connected by an integral base plate 100 which is attached to the lower housing portion by rivets 102 and 104. The frame leg 96 has an elongated aperture 108, the one elongated wall of which is included integral rack teeth 110 therealong. The frame leg 98 has a similar elongated aperture and rack teeth.

Belt spindles, generally indicated at 112 and 113, are mounted respectively within the elongated apertures 108 beneath the reels 34 and 60. The spindles are similarly constructed and have like elements identified by like numerals. The spindle 112 includes a pinion gear 114 having teeth 115 which mesh with the rack teeth 110 of frame leg 96. A like pinion gear, not shown, meshes with the rack teeth of the frame leg 98. The pinion gears are connected by a fixed bar 122 which is fixedly attached to the pinion gears and a pivoting bar 124 having its ends seated within triangular shaped apertures 128 of the pinion gears so that the pivoting bar 124 pivots between a normal position spaced more than one belt thickness away from the fixed bar 122 to a clamping position in which the pivoting bar 124 is pivoted toward the fixed bar 122 to clamp the belt 38 therebetween. A roller 130 is rotatably mounted on the pivoting bar 124. The belt passes around the rotating roller 130 to promote low effort travel of the restraint belts 38 and 62 through the spindle 112 during winding and unwinding of belt from the reel 60.

As best seen in FIGS. 1 and 4, coil loop spring assemblies 132 and 134 are respectively wrapped around discs 136 and 138 and carried respectively by the spindles 112 and 113. The coil loop spring assemblies 132 and 134 are anchored on the retractor lower housing portion 15 by spring anchor clips 140 and 142. Accordingly, the coil compression springs function to normally position the spindles at the normal downward position away from the reel but are yieldable to permit travel of the spindles upwardly along the rack teeth 110.

When the motor vehicle experiences a rapid deceleration condition, the pawls 76 and 78 are moved into locking engagement with the ratchet plates 66 and 68 of reels 34 and 60 by the tilting movement of the pendulum 72 and the lifting action of the transfer link 84. The forward momentum of the driver's seat occupant is restrained by the restraint belt 38. Referring to FIG. 3, it is seen that the load on the belt 62 induces movement of the belt spindle 92 upwardly along the elongated aperture 108 in the direction generally toward the reel 60 and the molded plastic belt guide 146 through which the belt exits the retractor housing 12. The meshing engagement of the rack teeth 110 with pinion gear teeth 118 causes the spindle 113 to move linearly up the rack teeth while rotating in the counterclockwise direction. Movement of the spindle 113 from the phantom line indicated position of FIG. 3 to the solid line indicated position of FIG. 3 causes the belt 62 to be progressively rolled up around the bars 122 and 124. The pivoting bar 124 is forcibly pivoted toward the fixed bar 122 so that the belt 62 is clamped between the bars. Reference may be had to U.S. Pat. No. 4,300,731, issued Nov. 17, 1981 to Joseph D. Kondziola for a more detailed description of the construction and operation of the belt roll-up and clamping mechanisms 90 and 92.

It will be understood that the locking pawls 76 and 78, the ratchet plates 66 and 68, and the reels 34 and 60 may be manufactured of plastic since the belt roll-up and clamping mechanisms 90 and 92 effectively transmit the occupant restraint load to the retractor housing and relieve the reels 34 and 60 of the occupant restraint load imposed on the belts.

Load Transfer Mechanism

Referring again to FIG. 1, a load transfer mechanism includes a reel 150 which is mounted on an auxiliary housing 151 suitably attached to the rectractor housing 12. The reel 150 is rotatably mounted by a reel shaft 152 which extends between spaced apart walls 153 and 155 of the auxiliary housing 151. A load transfer anchor belt 154 is conventionally attached to the reel shaft 152 and passes downwardly about a belt roller 156 mounted by an axle 158 between the legs 160 and 162 of a clevis 164. The belt 154 passes rearwardly around the roller 156 and is suitably attached to the vehicle floor by an anchor bracket 166 and an anchor bolt 168. The reel 150 has a pair of toothed ratchet plates, one of which is shown at 172. A windup spring, not shown, acts between the reel shaft 152 and the housing 12 to urge rotation of the reel 150 in the belt winding direction so that the anchor belt 154 is held in a taut condition during fore and aft adjusting.

A lock bar 176 is provided for selectively engaging the ratchet plates of the reel 150 to lock the reel against unwinding rotation. As best seen in FIG. 2, the lock bar 176 has pivot flanges, one of which is shown at 178, extending laterally of the lock bar 176 and into hourglass shaped openings of a yieldable plastic lock bar support 180. The lock bar support 180 is suitably attached to the auxiliary housing walls 153 and 155 by encircling the reel shaft 152 and by lateral extending projections, one of which is shown at 184, extending through aligned apertures of the walls 153 and 155. The lock bar support 180 is yieldable to permit bodily shifting movement of the lock bar 176 in the leftward direction as viewed in FIG. 2 so that shoulders 188 provided at each end of the lock bar 176 are carried into engagement with shoulders 189 provided respectively on the auxiliary housing walls 153 and 155.

The lock bar 176 is moved between its ratchet plate engaging and disengaging positions by an operator member 190 of injection molded plastic. The operator member 190 is suitably pivotally mounted on the lock bar support 180 by mating pivots 192 and apertures provided on the operator member 190 and the lock bar support 180. An inertia weight 194 is attached to the operator member 190 by a rivet 196 and functions to pivot the operator member 190 to the normal phantom line indicated position of FIG. 1 in which a pair of arms, one of which is designated 198 and seen in FIG. 2, engage the underside of the lock bar 176 to position the lock bar in the phantom line disengaged position of FIG. 1. The operator member 190 also has a pair of cam arms 202 and 204 which, as best seen in FIG. 4, project in the path of upward movement of the spindle discs 136 and 138. Accordingly, as best seen in FIGS. 2 and 4, the upward movement of either of the spindle discs 136 and 138 with its spindle will engage the cam and pivot the operator member 190 about its pivot axis to withdraw the arms 202 and 204 from support of the lock bar 176. The operator member 190 also carries a leaf spring 208 which overlies the lock bar 176 and urges the lock bar downwardly upon pivoting movement of the operator member 190 so that the lock bar 176 is forcibly biased downwardly into engagement with the toothed ratchet plates of the reel 150.

When the onset of an occupant restraint load on one of the restraint belts causes either of the belt roll-up and clamping spindles 112 and 113 to move upwardly to roll up and clamp the belt, the spring seat disc 136 or 138 associated with that spindle engages the cam arm 202 or 204 of the operating member 190 so that the support portion of the operating arm is withdrawn from support of the lock bar 176 and the leaf spring biases the pawl downwardly into engagement with the ratchet plate 172. The restraint belt load transferred to the retractor 10 and the vehicle seat urges a forward movement of the seat relative the vehicle body. However, the engagement of the lock bar 176 with the load transfer reel 150 prevents unwinding of the load transfer anchor belt 154 and thereby anchors the retractor against forward movement relative the vehicle body. The inertia weight attached to the operating member 190 also reacts to the deceleration of the vehicle and is capable of pivoting the operating member 190 independently of its actuating by the clamping mechanism to thereby cause the lock bar 176 to lock the reel 150 and anchor the retractor and seat against forward movement.

When the inertia stimulus is terminated and the occupant restraint load relieved from the restraint belt, the spindles 112 and 113 will be returned downwardly by the coil loop spring assembly 132 and 134. Accordingly, the discs 136 and 138 will be removed from engagement with the cam arms 202 and 204 to permit the inertia weight 194 to return the operator 190 to the phantom line indicated position of FIG. 1 in which the lock bar 176 is lifted from engagement with the reel 150 so that the anchor belt 154 may be wound and unwound from the reel 150 to permit fore and aft adjusting movement of the seat.

Thus, it is seen that the invention provides a new and improved seat belt retractor for mounting on a vehicle seat and more particularly provides an auxiliary reel for winding a load transfer anchor belt connected with the vehicle floor and a mechanism for locking the anchor belt reel in response to the actuation of restraint belt clamping means associated with the retractor or in response an inertia stimulus so that the retractor and seat are anchored against forward movement by the occupant restraint load imposed thereon.

While the invention has been disclosed primarily in terms of the specific embodiment shown in the drawings, it is not intended to be limited thereto, but rather only to the extent set forth in the appended claims.

The embodiments of the invention in which an exclusive property or privilege is claimed are defined as follows:

1. A seat belt retractor for winding and unwinding an occupant restraint belt and adapted for mounting on a vehicle seat mounted on a vehicle body, said retractor comprising:
   a housing;
   a belt reel rotatably mounted on the housing for restraint belt winding and unwinding rotation;
   reel locking means for selectively locking the reel against restraint belt unwinding rotation so that a load is imposed on the restraint belt during restraint of an occupant;
   belt clamping means movably mounted on the housing adjacent the exit of the restraint belt from the reel and being movable relative the housing and reel in response to imposition of occupant restraint load on the belt to clamp the restraint belt against extension from the retractor;

an anchor belt reel rotatably mounted on the housing for winding and unwinding an anchor belt having an end adapted for mounting on the vehicle body rearward of the seat;

a lock bar engageable with the anchor belt reel to lock the reel and thereby fix the length of the anchor belt to anchor the retractor housing and seat against forward movement by the occupant restraint load imposed on the restraint belt; and means acting between the belt clamping means and the lock bar and adapted to engage the lock bar with the anchor belt reel upon restraint belt clamping movement of the restraint belt clamping means relative the housing and reel in response to imposition of occupant restraint load.

2. A seat belt retractor for winding and unwinding an occupant restraint belt and adapted for mounting on a vehicle seat mounted on a vehicle body, said retractor comprising:

a housing;

a belt reel rotatably mounted on the housing for restraint belt winding and unwinding rotation;

reel locking means for selectively locking the reel against restraint belt unwinding rotation so that a load is imposed on the restraint belt during restraint of an occupant;

belt clamping means movably mounted on the housing adjacent the exit of the restraint belt from the reel and being movable relative the housing and reel in response to imposition of occupant restraint load on the belt to clamp the restraint belt against extension from the retractor;

an anchor belt reel rotatably mounted on the housing;

an anchor belt attached to the anchor belt reel and having an end adapted for mounting on the vehicle body rearward of the seat, a lock bar engageable with the anchor belt reel to lock the reel and thereby fix the length of the anchor belt to anchor the retractor housing and seat against forward movement by the occupant restraint load imposed on the restraint belt;

means acting between the belt clamping means and the lock bar adapted to engage the lock bar with the anchor belt reel upon restraint belt clamping movement of the restraint belt clamping means relative the housing and reel in response to imposition of occupant restraint load; and inertia sensing means operably associated with the lock bar to engage the lock bar with the anchor belt reel in response to a sensed condition of vehicle deceleration independently of the imposition of occupant restraint load actuating the belt clamping mechanism.

3. A seat belt retractor for winding and unwinding an occupant restraint belt and adapted for mounting on a vehicle seat mounted on a vehicle body, said retractor comprising:

a housing;

a belt reel rotatably mounted on the housing for restraint belt winding and unwinding rotation;

reel locking means for selectively locking the reel against restraint belt unwinding rotation so that a load is imposed on the belt during restraint of an occupant;

a spindle having a slot through which the belt passes during belt winding and unwinding rotation of the reel;

means mounting the spindle on the housing for bodily movement relative the housing when an occupant restraint load is imposed on the belt;

means acting between the housing and the spindle to effect rotation of the spindle simultaneous with the bodily movement of the spindle whereby the belt is rolled around the spindle to cinch the belt against movement in the unwinding direction independently of the locking of the reel by the reel locking means;

an anchor belt reel rotatably mounted on the housing for winding and unwinding an anchor belt having an end adapted for mounting on the vehicle body rearward of the seat;

a lock bar selectively engageable with the anchor belt reel to lock the reel and thereby fix the length of the anchor belt; and an operator member operatively associated with the lock bar and positioned in the path of bodily movement of the spindle whereby the operator member engages the lock bar with the anchor belt reel upon cinching of the restraint belt by the spindle to thereby lock the reel and fix the length of the anchor belt so that the retractor housing and seat are anchored against forward movement by the occupant restraint load imposed on the seat by the restraint belt.

* * * * *